(12) United States Patent
Klug et al.

(10) Patent No.: US 7,181,632 B2
(45) Date of Patent: Feb. 20, 2007

(54) DATA PROCESSING APPARATUS AND METHOD FOR OPERATING A DATA PROCESSING MODULE FOR SECURE POWER SAVING

(75) Inventors: Franz Klug, München (DE); Oliver Kniffler, München (DE)

(73) Assignee: Infineon Technologies AG, Munich (DE)

( * ) Notice: Subject to any disclaimer, the term of this patent is extended or adjusted under 35 U.S.C. 154(b) by 534 days.

(21) Appl. No.: 10/418,991

(22) Filed: Apr. 18, 2003

(65) Prior Publication Data

US 2004/0034806 A1 Feb. 19, 2004

(30) Foreign Application Priority Data

Apr. 18, 2002 (DE) .................................. 102 17 291

(51) Int. Cl.
*G06F 1/32* (2006.01)
(52) U.S. Cl. ........................................ 713/320; 713/300
(58) Field of Classification Search .................... None
See application file for complete search history.

(56) References Cited

U.S. PATENT DOCUMENTS

| | | | |
|---|---|---|---|
| 4,932,053 A * | 6/1990 | Fruhauf et al. ............. | 380/252 |
| 5,404,402 A | 4/1995 | Sprunk | |
| 6,327,661 B1 * | 12/2001 | Kocher et al. ................ | 380/47 |
| 6,498,404 B1 | 12/2002 | Thüringer et al. | |
| 6,728,892 B1 * | 4/2004 | Silvkoff et al. ............. | 713/320 |
| 2001/0035461 A1 | 11/2001 | Sedlak et al. | |
| 2002/0131596 A1 | 9/2002 | Boeckeler | |

FOREIGN PATENT DOCUMENTS

| | | |
|---|---|---|
| DE | 199 36 938 A1 | 4/2000 |
| DE | 198 50 721 A1 | 5/2000 |
| EP | 1 098 469 A1 | 5/2001 |
| WO | 00/19353 | 4/2000 |
| WO | 02/09030 A1 | 1/2002 |

OTHER PUBLICATIONS

Gray, Paul R, Robert G. Meyer, Analysis and Design of Analog Integrated Circuits, 1977, John Wiley and Sons, Inc., 3rd edition, pp. 715-720.*

* cited by examiner

*Primary Examiner*—Lynne H. Browne
*Assistant Examiner*—Anand B. Patel
(74) *Attorney, Agent, or Firm*—Laurence A. Greenberg; Werner H. Stemer; Ralph E. Locher

(57) ABSTRACT

A data processing apparatus comprises a data processing module, which can be operated in a first operating mode with a normal power consumption and a second operating mode, wherein a power consumption of the data processing module in the second operating mode is smaller than the first power consumption or equal to 0. The data processing apparatus further comprises means for signaling a possibility that the data processing module can be placed into the second operating mode, means for providing a time-varying control signal, means for placing the data processing module from one data operating mode to the other, wherein means for placing is formed to place the data processing module into the other operating mode, when means for signaling signals the possibility and the control signal fulfills a predetermined condition.

21 Claims, 2 Drawing Sheets

DATA PROCESSING APPARATUS AND METHOD FOR OPERATING A DATA PROCESSING MODULE FOR SECURE POWER SAVING

FIELD OF THE INVENTION

The present invention refers to data processing apparatus and particularly to data processing apparatus for processing security-relevant data.

BACKGROUND OF THE INVENTION AND PRIOR ART

Data processing apparatus are used more and more for processing security-relevant data. One reason for that is the increasing spread of chip cards, whereupon personal data are stored, or which are used for performing financial transactions. Such chip cards comprise a chip, which is either powered by a terminal into which the chip card is inserted, or which has its own power supply in form of a battery. Alternatively, chip cards exist for contactless applications, which have no power supply themselves, but draw the energy for the operation from a surrounding electromagnetic field.

The encryption and decryption tasks performed by such data processing apparatus are typically cryptographical algorithms, which can protect secret data from attackers. If contemplating a cash card, for example, it naturally has to be made impossible that an attacker unauthorizedly increases the amount of money made available by the cash card. On the other hand, it also has to be made sure that a terminal, which debits a cash card, only debits the agreed amount, and not a higher amount at the expense of the owner of the chip card.

The security for such applications is typically supplied by the cryptographical algorithms, such as the RSA algorithm as an example for an unsymmetrical encryption method or the DES algorithm as an example for a symmetrical encryption method.

Possible attacks to such chip cards consist of testing all imaginable possibilities and evaluating the results obtained there from. These so-called 'brute force' attacks are typically warded off by using cryptographical algorithms together with long numbers, so that such an attack will take up astronomical times in order to be successful.

Alternative attacks to data processing apparatus for security relevant data consist of indirect measures. A data processing apparatus is put into operation, and, for example, the power consumption or the electromagnetic radiation or the time, which is needed for a task, is established. Then, the same task is performed, but with changed input data, and again, indirect data, such as the power consumption of the data processing apparatus, are measured. If this measure is repeated with different input data arbitrarily often, a lot of information can be obtained based on statistical evaluations from a data processing apparatus, which is not protected against such indirect attacks. One known representative of such indirect attacks is the differential power analysis or DPA, wherein information about the program flow of a task, which is processed by a data processing apparatus, will be obtained via statistical evaluation of the current profile or the power consumption, respectively.

It is a known measure against such indirect attacks that the data processing apparatus, which comprises one or typically several data processing modules, has a possibly constant, i.e. homogenous current consumption, even when no task is performed. The data processing apparatus typically comprises a CPU, one or several crypto-coprocessors, a random number generator, an input/output apparatus, which is also known as UART (UART=universal asynchronous receive transmit), a memory management system for managing the available memories, which can for example be organized as virtual memory, etc., as data processing modules.

Obviously, not all data processing modules are needed simultaneously during the processing of a task by the data processing apparatus. Typically, only one data processing module or, if a parallel operating mode exists, a few of the available data processing modules are needed at a time. Thus, the CPU is, for example, idle, when the CPU has requested an external memory access from the memory management module. The CPU can only continue its operation when the data requested from the external memory are provided to the CPU from the memory manager and the virtual memory system (VMS), respectively.

A data processing apparatus, which has no counter measures against a performance analysis, would consume a lot of power during the time the CPU operates, and then, it would consume relatively little power during the external memory access, and then, when the data have been provided to the CPU from the external memory, it would again consume a lot of power.

In certain secure applications it is a security leakage, when such information leaks out. Thus, the CPU is operated here such that it performs so-called dummy operations during the time the external memory access takes place, which have no significance for the actual task of the data processing apparatus, but which have the effect that the CPU also consumes power during the time when the CPU has actually nothing to do. A power profile homogenized by dummy operations of the data processing apparatus can thus no longer be easily "tapped" and is thus at least more secured against DPA attacks as a data processing apparatus without such measures.

A disadvantage of this security concept is the fact that the current consumption of the data processing apparatus is significantly higher than it actually needs to be. If the CPU does not perform any dummy operation at the time when it is not needed, such as, for example, during an external memory access, which means it consumes less power or is even placed into a sleep mode, where it consumes even less or no power at all, the power consumption of the data processing apparatus could be reduced significantly. A reduced power consumption is particularly preferred for data processing apparatus with their own battery in the sense of a long lifetime of the battery. On the other hand, the power consumption of a data processing apparatus represents a serious limitation even when the data processing apparatus is provided on a chip card for contactless applications. In such contactless applications, the energy, which the data processing apparatus needs for the operation, is only drawn from the surrounding RF field and is thus inherently limited.

Thus, the renunciation of dummy operations and even the introduction of a sleep mode for a data processing module, respectively, lead to an optimum solution with regard to the energy consumption, but to an insecurity with regard to indirect attacks, since a distinct current profile results, from which information about secret facts can be drawn.

SUMMARY OF THE INVENTION

It is the object of the present invention to provide a secure and power-saving data processing apparatus as well as a secure and power-saving method for operating a data processing module.

In accordance with a first aspect of the invention, this object is achieved by a data processing apparatus having: a data processing module, which can be operated in a first operating mode with a first power consumption and a second operating mode, wherein a second power consumption of the data processing module in the second operating mode is smaller than the first power consumption or is equal to zero; means for signaling a possibility that the data processing module can be placed from one operating mode to the other operating mode; means for providing a time-varying control signal; and means for placing the data processing module from one operating mode to the other operating mode, wherein the means for placing is formed to place the data processing module into the other operating mode, when the means for signaling signals the possibility and the control signal fulfils a predetermined condition.

In accordance with a second aspect of the invention, this object is achieved by a method for operating a data processing module, which can be operated in a first operating mode with a first power consumption and in a second operating mode, wherein a second power consumption of the data processing module in the second operating mode is smaller than the first power consumption or equal to zero, having: detecting a possibility that the data processing module can be placed from one operating mode into the other operating mode; obtaining a time-varying control signal; checking, whether the control signal fulfils a predetermined condition; and placing the data processing module from one operating mode into the other operating mode, wherein the means for placing is formed to place the data processing module into the other operating mode, when the step of checking shows that the control signal fulfils the predetermined condition.

The present invention is based on the knowledge that the seemingly opposing aims for security against DPA attacks on the one hand, which means a homogenous current profile, and for a data processing apparatus with reduced power consumption on the other side, which means an inhomogeneous current profile, can be harmonized by placing a data processing module of a data processing apparatus in effect into an operating mode with reduced power or with a power consumption of 0, wherein this placing into the reduced operating mode takes place when the data processing module can be placed into the reduced operating mode, wherein, however, additionally, placing the data processing module into the reduced operating mode only takes place when further a time-varying control signal, which is preferably a random signal, fulfils a predetermined condition.

Thus, according to the invention, the data processing module is switched depending on the control signal between different operating modes, one of which can be a high operating mode, where the power consumption is higher than in a normal mode. Thus, the power profile is randomized and, additionally, by using the reduced operating mode power is saved.

Thus, according to the invention, a reduced operating mode, wherein a power consumption of a data processing module exists, which is smaller than the power consumption in a normal operating mode, or which is equal to 0 when fully turned off, is not used every time it is possible. On the other hand, the normal operating mode will not always be held, as it is actually desirable for a homogenous power profile. According to the invention, a middle course is taken, such that the reduced operating mode is used depending on the time-varying control signal, only when this control signal fulfils a predetermined condition.

Thus, the inventive data processing apparatus shows an increased power consumption compared to the case where the reduced operating mode is always used when possible, which is, however, smaller than the power consumption in the case of a homogenized power consumption, which is achieved when dummy operations are used.

Thus, the inventive data processing apparatus is advantageous in that it provides reduced power consumption with increased security. This is achieved by refraining from reduced operating mode several times during the processing of a task by the data processing apparatus, depending on the time-varying control signal, which is not understandable for an attacker.

In a preferred embodiment of the present invention, the control signal is a sequence of random numbers. If, for example, it is defined in a random bit, which represents a logical state of "0", that the predetermined condition is not fulfilled, only 50% of the possibilities are utilized, where the reduced operating mode can be used, but with the advantage that the power consumption is reduced, but is uncorrelated for different passes, i.e. different processes of the same task by the data processing apparatus.

It is an advantage of the present invention that the data processing apparatus is scalable according to a desired security level. For less security-critical cases, where still a certain security level has to be fulfilled, the time-varying control signal can be generated such that, for example, 90% of the possibilities for the reduced operating mode are used, while in other applications, where a high level of security is needed, 50% of the possibilities for the reduced operating mode are unused, or even more than 50% of the possibilities are unused, which results in a more and more homogenous current profile.

Particularly in those cases, where several data processing modules belong to one data processing apparatus, and where several data processing modules could enter the reduced operating mode simultaneously, a maximum power saving is achieved by placing all possible data processing modules into the reduced operating mode, depending on the time-varying control signal at different times, or merely by a few data processing modules operating in a reduced mode, while the others stay in the normal operating mode. The time-varying control signal makes sure that different data processing modules are in the reduced operating mode for different passes of the same task on the same data processing apparatus at certain program times, so that differential power attacks, as one example for indirect attacks, will fail.

BRIEF DESCRIPTION OF THE DRAWINGS

Preferred embodiments of the present invention will be discussed in more detail below with reference to the accompanying drawings. It shows.

DETAILED DESCRIPTION OF THE PREFERRED EMBODIMENTS

Figure 1:
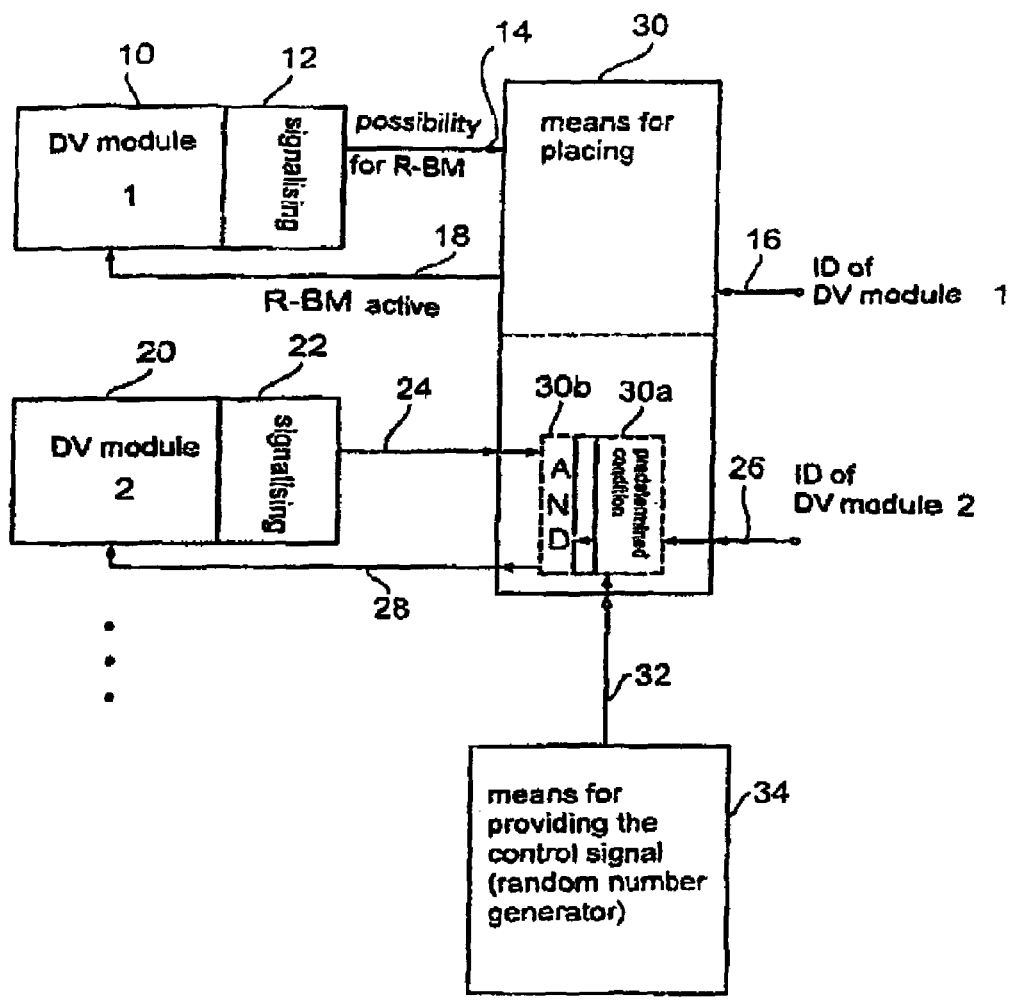
FIG. 1 is a block diagram of a preferred embodiment of the present invention.

FIG. 1 shows an inventive data processing apparatus with a first data processing module 1 (10) and a second data processing module 2 (20). Means 12 and 22, respectively, for signaling a possibility that the data processing module can be placed into the reduced operating mode, is associated to every data processing module. Means 12 and 22, respectively, provides a signal over a signaling line 14 and 24, respectively, which indicates this possibility to means 30 for placing the respective data processing module 10 and 20, respectively, into the reduced operating mode, wherein means 30 for placing is formed to place the respective data processing module into the reduced operating mode, when means 12 and 22, respectively, for signaling signals the possibility and a control signal on the control signal line 32 fulfils a predetermined condition. The control signal is placed on the control signal line 32 by means 34 for providing the control signal, wherein means 34 for providing the control signal is formed to provide a time-varying control signal, which comes, in a preferred embodiment of the present invention, from a random number generator.

In a data processing apparatus, such as it can be implemented on a chip card, several data processing modules exist, such as a CPU (CPU=central processing unit), one or several crypto-coprocessors, a memory management system for managing a volatile and/or a non-volatile external memory, a UART, a random number generator, etc. All such data processing modules have a normal operating mode with a normal power consumption and can also be operated in a reduced operating mode, wherein a power consumption of the data processing module is smaller in the reduced operating mode than a power consumption in the normal operating mode, or, when the data processing module is fully turned off in the reduced operating mode, it is equal to 0.

If the data processing apparatus merely comprises a data processing module, which can be placed into the reduced operating mode, the means 34 for providing the control signal is preferably formed such that it provides a sequence of randomly distributed binary ones and zeros, and that when the means for signaling signals a possibility for reduced operating mode, the data processing signal is placed into the reduced operating mode by means for placing 30, when the control signal has, for example, a logical "1", while a reduced operating mode is refrained from, when a currently present random number is a logical "0".

If several data processing modules, which can be placed into a reduced operating mode, exist in the data processing apparatus, as it is shown in FIG. 1, it is preferred to supply an identification (ID) of every data processing module to means 30 for placing via an identification line 16 and 26, respectively. It would be a preferred implementation, when a first logic circuit 30a checks, whether the predetermined condition between the control signal and the identification of the associated data processing module exists, to then AND the result of the check of the predetermined condition and the output signal of the signaling means 22 via an gate 30b. A reduced operating mode active signal on an output line 28 and 18, respectively, will only arise when both a possibility for the reduced operating mode exists and the predetermined condition of the control signal is fulfilled, which means that it has a predetermined relationship to the identification of the data processing module.

An example, where the CPU of the data processing apparatus can be placed into the reduced operating mode exists, when the CPU does not find certain information in its internal memory and thus directs the memory management unit to perform an external memory access, to load the required information from the external memory to the internal memory. This load operation will take a certain time, during which the CPU can be placed into the reduced operating mode, which is also referred to as 'power suspend mode', to save power. In this case, means 12 for signaling the possibility of a reduced operating mode is realized by the part of the CPU which outputs the request to the memory management unit, to start an external memory access. The request itself represents the signal, which is transmitted on line 14 of FIG. 1 to means 30 for placing the data processing module into the reduced operating mode.

In an alternative case, the reduced operating mode management can also be performed centrally, separated from the individual data processing modules, such that not every data processing module has its own signaling unit, but that a central signaling unit exists for all individual data processing modules.

According to the invention, the power turn-off and the placing into the reduced operating mode, respectively, is not performed deterministically at any occasion, i.e. at every possibility. Instead, the turn-off is performed time-varying and preferably according to non-deterministic rules. These non-deterministic rules can best be generated by a random number, so that the program flow varies so massively between individual passes of the data processing apparatus, which means between individual processes of the same task possibly with changed input parameters, so that even all possible reduced operating modes can be utilized. These can be filtered out statistically only with an increased computing effort, if it is possible at all.

Therefore, means 34 for providing comprises a physical random number generator, which is preferably a physical random number generator, which is based on a physical noise process, such as a thermal noise of a resistor or a shot noise of a diode.

The randomized turn-off of the CPU makes sense when the initial sequence is considered. During the first so-called page table walk (PTW), the CPU is still deterministic. A turn-off of the CPU during this initial PTW would be immediately measurable in a DPA. Thus, it is preferred, to generally prevent a turn-off of the CPU from the start, which means placing the CPU into the reduced operating mode during the first PTW, and only go into the reduced operating mode with later possibilities—depending on the time-varying control signal.

Thus, by randomizing the reduced operating mode activation and by randomizing the turn-off of the reduced operating mode, thus, a significant reduction of the current consumption is achieved, wherein, however, security demands to a high-security circuit are maintained.

As it has already been mentioned, it is preferred to perform the reduced operating mode control via a random number. If the CPU initiates an external memory access in this preferred embodiment of the present invention, the reduced operating mode will be activated in dependence on the random number. The CPU recognizes based on a handshake signal from the memory management unit, which is formed as VMS (VMS=virtual memory system) that the memory access is terminated and the data are now supplied to the CPU. Means 30 for placing the data processing module into the reduced operating mode will thus deactivate the reduced operating mode line 80, 28, respectively, again, to place the CPU into the normal operating mode again, so that the data supplied by the external memory can be processed normally. When the CPU changes into a power suspend mode in dependence on a random number and the VMS notifies the successful termination of the memory access by another random number in a delayed way and then provides the data, the program flow is changed in every pass such that these randomized reduced operating mode periods can not be recognized via a DPA.

It should be noted that the inventive concept is not limited to the turn-off of a CPU as an example for a data processing module, but that this concept can be used for all data processing modules, which can be operated in a reduced operating mode, and where the possibility, that they can be placed into a reduced operating mode, can be signaled, and which interact with other data processing modules such that they have to wait for the delivery of data from another data processing module before they can continue with their own task.

Figure 2:
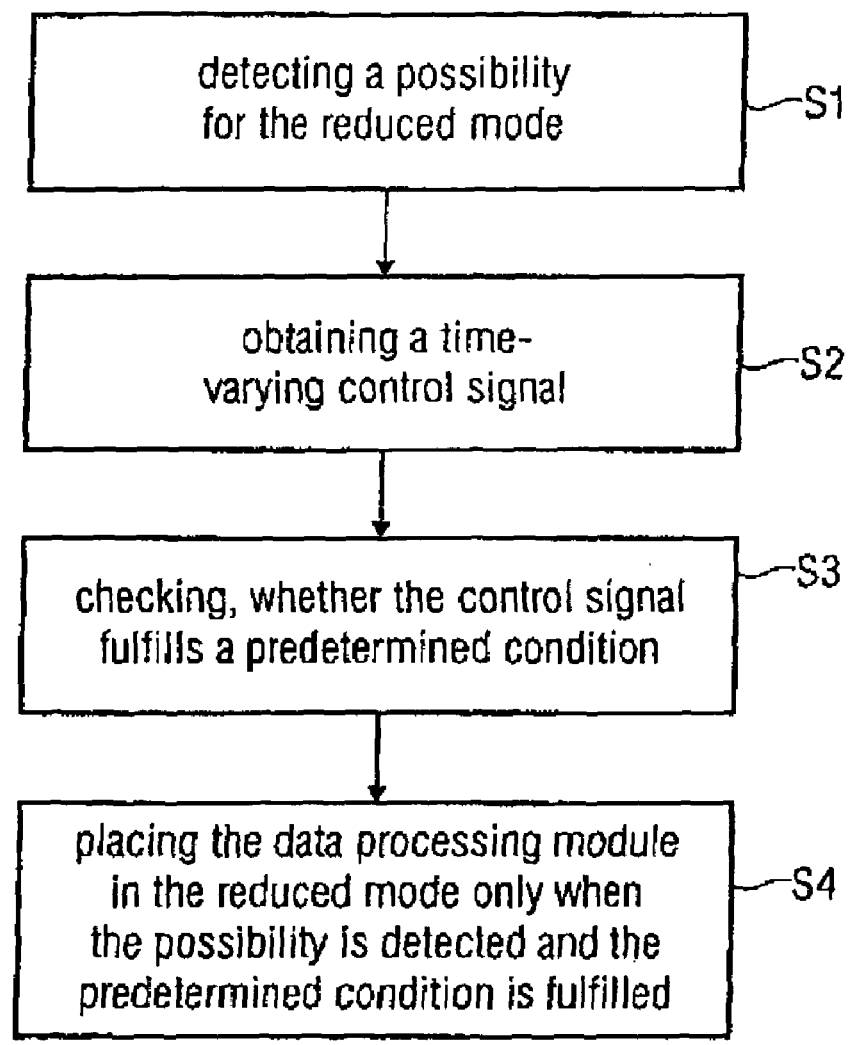
FIG. 2 is a flow chart illustrating a preferred embodiment of the inventive method.

FIG. 2 illustrates a preferred embodiment of the inventive method. In step S1, a possibility for the reduced mode is detected. In step S2, a time-varying control signal is obtained. In step S3, it is checked whether the control signal fulfills a predetermined condition. In step S4, the data processing module is placed in a reduced mode only if the possibility is detected in step S1 and if the predetermined condition is fulfilled as determined in step S3.

The invention claimed is:

1. Data processing apparatus comprising:
a data processing module, which can be operated in a first operating mode with a first power consumption and a second operating mode, wherein a second power consumption of the data processing module in the second operating mode is smaller than the first power consumption or is equal to zero;
a signaler for signaling a possibility that the data processing module can be placed from the first operating mode to the second operating mode;
a provider for providing a time-varying control signal; and
a placer for placing the data processing module from the first operating mode to the second operating mode, wherein the placer is formed to place the data processing module into the second operating mode, only when the signaler signals the possibility and the control signal fulfils a predetermined condition;
a further data processing module, which can be operated in a first operating mode with normal power consumption and in a second operating mode, wherein a power consumption of the further data processing module in the second operating mode is smaller than the normal power consumption or equal to zero;
a further signaler for signaling a possibility that the further data processing module can be placed from the first operating mode into the second operating mode; and
a further placer for placing the further data processing module into the second operating mode, when the further signaler signals the possibility and the control signal fulfils a predetermined condition.

2. Data processing apparatus according to claim 1, wherein the provider is formed to provide a sequence of random numbers as a control signal.

3. Data processing apparatus according to claim 1, wherein the provider is formed to provide a control signal with a plurality of different logical states, and wherein the placer is formed to use a logical state of the plurality of the logical states as the predetermined condition.

4. Data processing apparatus according to claim 1, wherein the placer is fanned to request a control signal when the possibility is signaled or to use a currently present control signal, to determine whether the predetermined condition is fulfilled.

5. Data processing apparatus according to claim 1, wherein an own data processing module identification is associated to every data processing module, and wherein the placer is formed to check, whether the control signal has a predetermined relationship to a data processing module identification, and the control signal fulfills the predetermined condition for the data processing module identification when the control signal has the predetermined relationship.

6. Data processing apparatus according to claim 1, wherein the data processing module is a CPU, and wherein the signaler is formed to signal the possibility when the CPU activates an external memory access.

7. Data processing apparatus according to claim 1, wherein the signaler is further formed to signal an end of the second operating mode, and
wherein the placer is formed to place the data processing module into the first operating mode at a signaled end of the second operating mode.

8. Data processing apparatus according to claim 1, formed to perform a data processing task in several timely subsequent passes, and
wherein the provider is formed to provide the control signals for different passes in a different way.

9. Data processing apparatus according to claim 1, wherein the provider comprises a physical random number generator.

10. Data processing apparatus according to claim 9, wherein the physical random number generator is based on a physical noise process, such as a thermal noise of a resistor or a shot noise of a diode.

11. Data processing apparatus according to claim 1, which is implemented as a security IC or as a processor for a chip card with its own battery or for contactless applications.

12. Data processing apparatus according to claim 1, wherein the first operating mode is the normal operating mode in which normal power consumption takes place, and wherein the second operating mode is the reduced operating mode.

13. Data processing apparatus according to claim 1, wherein the data processing module can further be operated in a third operating mode, wherein a power consumption in the third operating mode is higher than the power consumption in the second operating mode,
wherein the placer is formed to place the data processing module into the third operating mode, when the control signal fulfils a predetermined condition.

14. Method for operating a data processing apparatus, the apparatus including a data processing module, which can be operated in a first operating mode with a first power consumption and in a second operating mode, wherein a second power consumption of the data processing module in the second operating mode is smaller than the first power consumption or equal to zero, and a further data processing module, which can be operated in a first operating mode with normal power consumption and in a second operating mode, wherein a power consumption of the further data processing module in the second operating mode is smaller than the normal power consumption or equal to zero, the method comprising:
providing a time-varying control signal;
signaling a possibility that the data processing module or the further data processing module can be placed from the first operating mode into the second operating mode;
placing the data processing module from the first operating mode into the second operating mode only when the possibility for the data processing module is signaled and the time-varying control signal fulfills a predetermined condition; and
placing the further data processing module into the second operating mode when the possibility for the further data processing module is signaled and the time-varying control signal fulfills a predetermined condition.

15. Method according to claim 14, wherein the time-varying control signal is a sequence of random numbers.

16. Method according to claim 15, wherein a plurality of data processing modules is provided and wherein it is checked in the step of checking, whether a predefined relationship is present between a random number of the sequence of random numbers and an identification of a data processing module.

17. Data processing apparatus comprising:
a data processing module, which can be operated in a first operating mode with a first power consumption and a second operating mode, wherein a second power consumption of the data processing module in the second operating mode is smaller than the first power consumption or is equal to zero;
a signaler for signaling a possibility that the data processing module can be placed from one operating mode to the other operating mode;
a provider for providing a time-varying control signal;
a placer for placing the data processing module from one operating mode to the other operating mode, wherein the placer is formed to place the data processing module into the other operating mode, when the signaler signals the possibility and the control signal fulfils a predetermined condition;
a further data processing module, which can be operated in a normal operating mode with normal power consumption and in a reduced operating mode, wherein a power consumption of the further data processing module in the reduced operating mode is smaller than the normal power consumption or equal to zero;
a further signaler for signaling a possibility that the further data processing module can be placed from one operating mode into the other operating mode; and
a further placer for placing the further data processing module into the other operating mode, when the further signaler signals the possibility and the control signal fulfils a predetermined condition;
wherein an own data processing module identification is associated to every data processing module; and
wherein the placer or the further placer is formed to check, whether the control signal has a predetermined relationship to a data processing module identification, wherein the control signal fulfills the predetermined condition for the data processing module identification when the control signal has the predetermined relationship.

18. Data processing apparatus comprising:
a data processing module, which can be operated in a first operating mode with a first power consumption and a second operating mode, wherein a second power consumption of the data processing module in the second operating mode is smaller than the first power consumption or is equal to zero;
a signaler for signaling a possibility that the data processing module can be placed from one operating mode to the other operating mode;
a provider for providing a time-varying control signal; and
a placer for placing the data processing module from one operating mode to the other operating mode, wherein the placer is formed to place the data processing module into the other operating mode, when the signaler signals the possibility and the control signal fulfils a predetermined condition;
wherein the signaler is further formed to signal an end of the other operating mode; and
wherein the placer is formed to place the data processing module into the one operating mode at a signaled end of the other operating mode.

19. Method for operating a data processing module, which can be operated in a first operating mode with a first power consumption and in a second operating mode, wherein a second power consumption of the data processing module in the second operating mode is smaller than the first power consumption or equal to zero, the method comprising:
detecting a possibility that the data processing module can be placed from one operating mode into the other operating mode;
obtaining a time-varying control signal;
checking, whether the control signal fulfils a predetermined condition; and
placing the data processing module from one operating mode into the other operating mode, wherein means for placing is formed to place the data processing module into the other operating mode, when the step of checking shows that the control signal fulfils the predetermined condition;
wherein the time-varying control signal is a sequence of random numbers;
wherein a plurality of data processing modules is provided; and
wherein it is checked in the step of checking, whether a predefined relationship is present between a random number of the sequence of random numbers and an identification of a data processing module.

20. Data processing apparatus comprising:
a data processing module, which can be operated in a first operating mode with a first power consumption and a second operating mode, wherein a second power consumption of the data processing module in the second operating mode is smaller than the first power consumption or is equal to zero;
a signaler for signaling a possibility that the data processing module can be placed from the first operating mode to the second operating mode;
a provider for providing a time-varying control signal, the provider being formed to provide a sequence of random numbers as the time-varying control signal; and
a placer for placing the data processing module from the first operating mode to the second operating mode, wherein the placer is formed to place the data processing module into the second operating mode, only when the signaler signals the possibility and the time-varying control signal fulfils a predetermined condition.

21. Method for operating a data processing module, which can be operated in a first operating mode with a first power consumption and in a second operating mode, wherein a second power consumption of the data processing module in the second operating mode is smaller than the first power consumption or equal to zero, the method comprising:
detecting a possibility that the data processing module can be placed from the first operating mode into the second operating mode;
obtaining a time-varying control signal, the time-varying control signal being a sequence of random numbers;
checking, whether the time-varying control signal fulfils a predetermined condition; and
placing the data processing module from the first operating mode into the second operating mode only when the step of checking shows that the time-varying control signal fulfils the predetermined condition and the step of detecting detects the possibility.

* * * * *